No. 693,573. Patented Feb. 18, 1902.
M. J. SINNOTT.
ELASTIC TREAD HORSESHOE.
(Application filed Mar. 18, 1901.)
(No Model.)
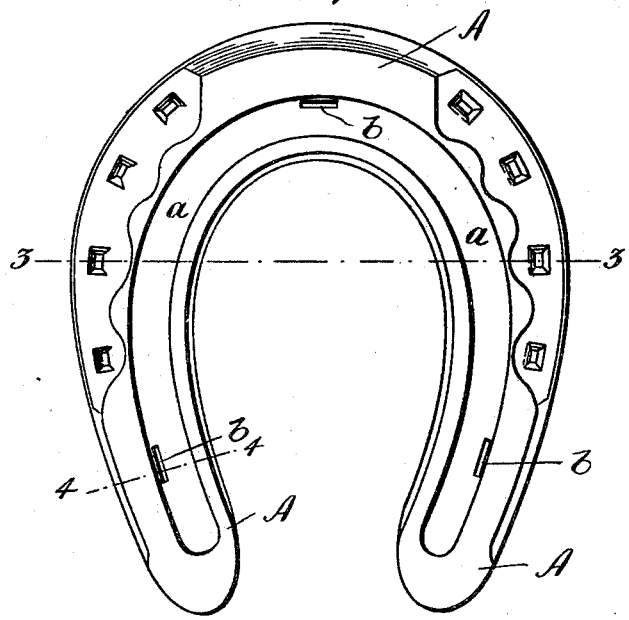
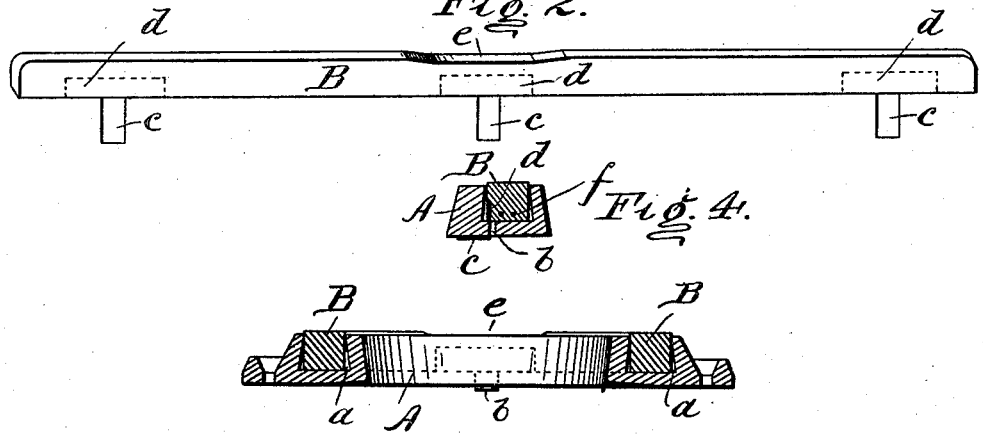
Witnesses.
Clarence E. Mellhope.
George B. Kridler
Inventor.
Martin J. Sinnott
by Alfred M. Allen
Attorney.

UNITED STATES PATENT OFFICE.

MARTIN J. SINNOTT, OF BROOKLYN, NEW YORK, ASSIGNOR TO THE EXPANDING TREAD COMPANY, OF NEW YORK, N. Y., A CORPORATION OF NEW JERSEY.

ELASTIC-TREAD HORSESHOE.

SPECIFICATION forming part of Letters Patent No. 693,573, dated February 18, 1902.

Application filed March 18, 1901. Serial No. 51,672. (No model.)

*To all whom it may concern:*

Be it known that I, MARTIN J. SINNOTT, a citizen of the United States, residing at Brooklyn, in the county of Kings and State of New York, have invented certain new and useful Improvements in Elastic-Tread Horseshoes, of which the following is a full, clear, and exact description, reference being had to the accompanying drawings, forming part of this specification.

My invention relates to horseshoes in which an elastic tread is provided to relieve the horse from jars and to prevent slipping; and the improvements relate particularly to that certain novel and useful method of retaining the packing in place when the shoe is in use, to be hereinafter particularly pointed out and claimed.

In the use of elastic treads for horseshoes in which a packing of rubber or other suitable elastic material is inserted in a suitable groove or grooves in the base of the shoe great difficulty has been experienced in properly securing the packing in the groove. Under the rough usage to which all such shoes must be subjected while in use the packing is pressed away from the metal edges of the groove and dirt is ground in between the rubber and the groove and forms a wedge to pry out the rubber. With rubber packing also the pressure on the rubber as it comes in contact with the ground tends to elongate the rubber strip or strips, and thus to force the rubber out of the groove. A great many different methods have been employed to secure the packing in the groove, but none of them in use have been found to be entirely satisfactory. Screws or nails inserted through the packing and into the body of the shoe weaken the packing at the points of insertion and very soon pull through the rubber. Plates secured to the base of the rubber packing with lugs to be attached to the body of the shoe pull away from the packing, and in those cases where the packing is sought to be clamped between the side edges of the shoe in various ways the elasticity of the packing prevents a permanent attachment for the rubber in the groove.

It is desirable also in these elastic-tread horseshoes that the packing should be inserted and secured in place after the horseshoe is fitted to the foot, so that the shoes and the packing can be sold separately, the shoe heated and fitted to the foot, and then the packing secured in place. In order to accomplish this, it is evident that some means must be devised under which the packing can be readily and easily secured by any horseshoer that may have occasion to make use of the elastic-tread shoe.

It is the purpose, therefore, of my invention to provide a simple, cheap, and effective fastening for the rubber packing, and also in the same connection to prevent the elongation of the packing under pressure, as above noted.

In the drawings, Figure 1 is a bottom plan view of my improved horseshoe with the packing removed therefrom. Fig. 2 is a perspective view of the packing, showing the fastening devices. Fig. 3 is a cross-section of the shoe, taken on the line 3 3 of Fig. 1. Fig. 4 is a section taken on the line 4 4 of Fig. 1.

A is the body of the shoe, made of the usual material and provided with a groove $a$ on the under surface, preferably extending from heel to heel, and preferably also of the same width and depth throughout.

B is a strip of packing for the insertion in this groove, made of rubber or other suitable elastic material. The groove for the packing is also preferably made with side walls, which converge or are beveled, so that the base of the groove is wider than at the top, and the rubber packing, which is preferably rectangular in cross-section, does not quite fill out the groove, allowing room for the packing to expand laterally under compression while in use, so as to prevent the wearing down of the rubber to a level with the metal surface of the shoe.

$b\ b$ are slots formed in the base of the groove through the shoe to allow for the insertion of the tongues or prongs $c\ c$ on the plates $d\ d$. These plates are preferably of metal and they are secured to the side wall of the rubber packing in any suitable way; but the preferable way and the method I have adopted in practice is to lay the plates in the mold with the unvulcanized rubber and then to vulcanize the rubber and the plate thereto. The point of special importance, however, is that these plates are attached to the side of the packing and not to the base or in the body of the packing. The plates are flat and of considerable length, and they are attached to the side of the packing so as to in no way weaken the body of the rubber. It will be evident from this that when the projecting prongs c c are passed through the slots of the shoe and turned over at right angles or clenched to secure the rubber in the groove the strain exerted on the rubber to tear it from the groove will be exerted against the flat surfaces of the plates d d edgewise and that it will be difficult to pull the rubber from the plate. If the plate were attached to the base of the rubber, the strain would then readily tend to strip the rubber therefrom; but with my method of, as it were, gluing or vulcanizing the plate to the side wall of the packing the strain has no tendency to strip off the rubber from the plate, but merely pull it edgewise along the side wall. It is therefore impossible to tear the rubber from the groove under any strain that can be exerted by the wedging force of gravel or dirt between the metal of the shoe and the side wall of the packing.

I have found that when the rubber packing is formed of the same dimensions throughout and the rubber is curved to be inserted in the curved groove in the shoe the packing is very apt to buckle at the center of the toe farthest from the inside wall, and as the greatest tearing strain is naturally at the toe portion of the shoe, which strikes the ground first, this buckling is very apt to weaken the fastening at this point and in a short time the rubber strip might be rolled or pulled out of the shoe. To prevent this buckling, I therefore lessen the amount of the rubber at the toe, as shown at e. This enables me to insert the packing smoothly and to render it next to impossible for the horse to pull out the packing.

In order to prevent the elongation of the packing under the weight of the horse and the consequent buckling up of the strip or its pushing out at the ends, I insert in the soft rubber lengthwise before it is vulcanized a string or strings f, of non-elastic fibrous material, which strings run lengthwise from end to end of the packing and destroy or minimize its elasticity lengthwise, while in no way affecting its compression as a cushion for the shoe.

I have illustrated a shoe in which the groove is continuous running from heel to heel; but it will be understood that a succession of grooves can be employed instead of a single continuous groove, and I have also shown three slots and prongs for securing the packing in place; but the number of these points of attachment may be varied as occasion may demand without departing from my invention, which, it will be understood in this connection, relates to the attachment of the retaining-plate along the side wall of the packing.

Having thus described my invention, what I claim, and desire to secure by Letters Patent, is—

1. In a horseshoe, provided with a groove in the under surface, an elastic packing fitted in said groove, and plates secured to the side wall of the packing, with means for securing said plates to the shoe, substantially as shown and described.

2. In a horseshoe, provided with a groove in the under surface, an elastic packing fitted in said groove, and plates secured to the side wall of the packing, with prongs on the plates and slots in the base of the groove through which said prongs are inserted and clenched to hold the packing in the groove, substantially as shown and described.

3. In a horseshoe, provided with a continuous groove in the under surface running from heel to heel, a continuous rubber packing therefor cut away or diminished on its outer face at its middle portion to permit curving without buckling to prevent its being torn from the groove, and means for securing said packing in place, substantially as shown and described.

4. In a horseshoe, provided with a continuous groove in the under surface running from heel to heel, a rubber packing therefor cut away or diminished at its middle portion to permit curving without buckling, and plates secured to the side walls of the packing, with prongs on the plates and slots in the base of the groove through which said prongs are inserted and clenched to hold the packing in the groove, substantially as shown and described.

MARTIN J. SINNOTT.

Witnesses:
C. HENDRICKS,
H. COMER.